United States Patent
Kuwata

(10) Patent No.: US 7,751,644 B2
(45) Date of Patent: Jul. 6, 2010

(54) GENERATION OF IMAGE QUALITY ADJUSTMENT INFORMATION AND IMAGE QUALITY ADJUSTMENT WITH IMAGE QUALITY ADJUSTMENT INFORMATION

(75) Inventor: Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1393 days.

(21) Appl. No.: 10/937,799

(22) Filed: Sep. 8, 2004

(65) Prior Publication Data

US 2005/0141777 A1  Jun. 30, 2005

(30) Foreign Application Priority Data

Sep. 9, 2003  (JP)  ............................. 2003-316128
Sep. 1, 2004  (JP)  ............................. 2004-253801

(51) Int. Cl.
*G06K 9/40* (2006.01)
(52) U.S. Cl. ...................... 382/275; 382/168; 382/274; 358/1.9; 348/625; 345/617
(58) Field of Classification Search .................. 382/254, 382/167, 168, 274; 358/1.9; 348/625; 345/617
See application file for complete search history.

(56) References Cited

U.S. PATENT DOCUMENTS

| 5,469,536 | A * | 11/1995 | Blank | 345/594 |
| 2001/0007599 | A1 * | 7/2001 | Iguchi et al. | 382/274 |
| 2003/0151667 | A1 * | 8/2003 | Nakami et al. | 348/207.1 |

FOREIGN PATENT DOCUMENTS

| JP | 10-208034 | 8/1998 |
| JP | 10-271524 | 10/1998 |
| JP | 2000-165647 | 6/2000 |

OTHER PUBLICATIONS

Abstract of Japanese Patent Publication No. 10-208034, Pub. Date: Aug. 7, 1998, Patent Abstracts of Japan.
Abstract of Japanese Patent Publication No. 10-271524, Pub. Date: Oct. 9, 1998, Patent Abstracts of Japan.
Abstract of Japanese Patent Publication No. 2000-165647, Pub. Date: Jun. 16, 2000, Patent Abstracts of Japan.

* cited by examiner

*Primary Examiner*—Charles Kim
*Assistant Examiner*—John W Lee
(74) *Attorney, Agent, or Firm*—Martine Penilla & Gencarella, LLP

(57) ABSTRACT

A CPU 200 extracts ornamental image data and layout control information from an ornamental image file FF. When the layout control information does not include characteristic values, the CPU 200 analyzes the ornamental image data to acquire characteristic values representing a tendency of image quality of the ornamental image data. The CPU 200 may additionally compute correction rates for correcting values of image quality-relating parameters of objective image data from the acquired characteristic values of the ornamental image data. The CPU 200 writes either the acquired characteristic values or the computed correction rates into the layout control information. The layout control information including the acquired characteristic values or the computed correction rates is output together with the ornamental image data in the form of the ornamental image file FF.

4 Claims, 12 Drawing Sheets

GENERATION OF IMAGE QUALITY ADJUSTMENT INFORMATION AND IMAGE QUALITY ADJUSTMENT WITH IMAGE QUALITY ADJUSTMENT INFORMATION

BACKGROUND OF THE INVENTION

1. Field of Technology

The present invention relates to a technique of executing series of image processing with regard to objective image data, which has a layout location and layout dimensions relative to ornamental image data specified by layout control information.

2. Description of the Related Art

There are some practical techniques of pasting objective image data, for example, image data taken by an imaging device, on ornamental image data, for example, frame image data, to output a resulting output image including an objective image surrounded by an ornamental image on a medium, such as paper. This technique uses layout control information including a script that describes a layout location and layout dimensions of the objective image data laid out on the ornamental image data.

The layout control information is related to the ornamental image data. In response to the user's selection and layout of objective image data on ornamental image data, this technique pastes the objective image data resized to preset dimensions at a preset location in the ornamental image data and thereby generates a resulting output image including the objective image surrounded by the ornamental image.

In the prior art, the layout control information simply specifies the layout of the objective image data on the related ornamental image data but does not describe information regarding image quality adjustment of the objective image data to be pasted on the ornamental image data.

The prior art technique does not execute image quality adjustment of the objective image data to be laid out on the ornamental image data by taking into account the image quality tendencies of the ornamental image data, for example, the brightness and the color. This may result in a poor image quality balance between the objective image data and the ornamental image data.

SUMMARY OF THE INVENTION

The object of the invention is thus to eliminate the drawbacks of the prior art and to execute image quality adjustment of objective image data, in order to attain good image quality balance between ornamental image data and the objective image data. The object of the invention is also to execute easy and prompt image quality adjustment of objective image data by taking into account the image quality of ornamental image data.

In order to attain at least part of the above and the other related objects, a first aspect of the invention is directed to an image quality adjustment information generation method that generates image quality adjustment information with regard to objective image data, which is laid out on ornamental image data. The image quality adjustment information generation method of the first aspect of the invention includes obtaining the ornamental image data; analyzing the obtained ornamental image data to acquire an image quality characteristic of the ornamental image data; and writing the acquired image quality characteristic into layout control information, which is related to the ornamental image data and specifies a layout location and layout dimensions of the objective image data to be laid out on the ornamental image data.

The image quality adjustment information generation method of the first aspect of the invention analyzes the obtained ornamental image data to acquire the image quality characteristic of the ornamental image data, and writes the acquired image quality characteristic into the layout control information, which is related to the ornamental image data and specifies the layout location and the layout dimensions of the objective image data to be laid out on the ornamental image data. This arrangement uses the layout control information (related to the ornamental image data) for image quality adjustment of the objective image data to attain the good image quality balance between the ornamental image data and the objective image data. The image quality characteristic of the ornamental image data is included in the layout control information. This arrangement enables easy and prompt image quality adjustment of the objective image data by taking into account the image quality of the ornamental image data.

In the image quality adjustment information generation method of the first aspect of the invention, it is preferable that the analyzing the obtained ornamental image data and the writing the acquired image quality characteristic are executed only when the layout control information includes neither description of an image quality characteristic nor description of a correction rate. When the image quality characteristic is included in the layout control information, acquisition of the image quality characteristic of the ornamental image data by analysis is not required. Omission of these steps under such conditions desirably shortens the total processing time. This arrangement also ensures the preferential use of the image quality characteristic described in the layout control information.

In one preferable application of the first aspect of the invention, the image quality adjustment information generation method further includes acquiring an image quality characteristic specification indicator for specifying a tendency of the image quality characteristic of the ornamental image data; computing a correction rate of the objective image data from the acquired image quality characteristic specification indicator and the acquired image quality characteristic of the ornamental image data; and writing the computed correction rate, instead of the acquired image quality characteristic, into the layout control information. This arrangement ensures adequate control of the image quality adjustment of the objective image data according to the layout control information.

In the image quality adjustment information generation method of the first aspect of the invention, it is preferable that the computing the correction rate and the writing the computed correction rate are executed only when the layout control information does not include description of the correction rate. When the correction rate is included in the layout control information, computation of the correction rate is not required. Omission of these steps under such conditions desirably shortens the total processing time. This arrangement also ensures the preferential use of the correction rate described in the layout control information.

A second aspect of the invention is directed to an image quality adjustment information generation method that generates image quality adjustment information with regard to objective image data, which is laid out on ornamental image data. The image quality adjustment information generation method of the second aspect of the invention includes obtaining the ornamental image data; analyzing the obtained ornamental image data to acquire a statistical value of an image quality-relating parameter regarding image quality of the ornamental image data; and writing the acquired statistical value into layout control information, which is related to the ornamental image data and specifies a layout location and layout dimensions of the objective image data to be laid out on the ornamental image data.

The image quality adjustment information generation method of the second aspect of the invention analyzes the obtained ornamental image data to acquire the statistical value of the image quality-relating parameter of the ornamental image data, and writes the acquired statistical value into the layout control information, which is related to the ornamental image data and specifies the layout location and the layout dimensions of the objective image data to be laid out on the ornamental image data. This arrangement uses the layout control information (related to the ornamental image data) for image quality adjustment of the objective image data to attain the good image quality balance between the ornamental image data and the objective image data. The statistical value of the ornamental image data is included in the layout control information. This arrangement enables easy and prompt image quality adjustment of the objective image data by taking into account the image quality of the ornamental image data.

In the image quality adjustment information generation method of the second aspect of the invention, it is preferable that the analyzing the obtained ornamental image data and the writing the acquired characteristic value are executed only when the layout control information does not include description of the statistical value of the image quality-relating parameter. When the statistical value of the image quality-relating parameter is included in the layout control information, acquisition of the statistical value of the image quality-relating parameter by analysis is not required. Omission of these steps under such conditions desirably shortens the total processing time. This arrangement also ensures the preferential use of the statistical value of the image quality-relating parameter described in the layout control information.

In one preferable application of the second aspect of the invention, the image quality adjustment information generation method further includes acquiring a reference value of the image quality-relating parameter for specifying a tendency of image quality characteristic of the ornamental image data; computing a correction rate of the image quality-relating parameter of the objective image data from the acquired reference value of the image quality-relating parameter and the acquired statistical value of the image quality-relating parameter of the ornamental image data; and writing the computed correction rate of the image quality-relating parameter, instead of the acquired statistical value, into the layout control information. This arrangement ensures adequate control of the image quality adjustment of the objective image data according to the layout control information.

In the image quality adjustment information generation method of the second aspect of the invention, it is preferable that the computing the correction rate and the writing the computed correction rate are executed only when the layout control information does not include description of the correction rate of the image quality-relating parameter. When the correction rate of the image quality-relating parameter is included in the layout control information, computation of the correction rate of the image quality-relating parameter is not required. Omission of these steps under such conditions desirably shortens the total processing time. This arrangement also ensures the preferential use of the correction rate of the image quality-relating parameter described in the layout control information.

A third aspect of the invention is directed to an image processing method that executes image processing of objective image data, which is laid out on ornamental image data.

The image processing method of the third aspect of the invention includes obtaining the ornamental image data; obtaining the objective image data, which is to be laid out in a layout location of the ornamental image data; obtaining layout control information, which is related to the ornamental image data, specifies a layout location and layout dimensions of the objective image data to be laid out on the ornamental image data, and includes description of an image quality characteristic representing an image quality tendency of the ornamental image data; adjusting image quality of the objective image data, based on the image quality characteristic described in the obtained layout control information; and combining the image quality-adjusted objective image data with the ornamental image data according to the layout control information, so as to generate output image data.

The image processing method of the third aspect of the invention obtains the layout control information, which specifies a layout location and layout dimensions of the objective image data to be laid out on the ornamental image data and includes description of an image quality characteristic representing an image quality tendency of the ornamental image data. The image processing method adjusts the image quality of the objective image data based on the image quality characteristic described in the obtained layout control information, and generates output image data as the combination of the image quality-adjusted objective image data and the ornamental image data according to the layout control information. This arrangement ensures image quality adjustment of the objective image data to attain good image quality balance between the ornamental image data and the objective image data, while enabling easy and prompt image quality adjustment of objective image data by taking into account the image quality of ornamental image data.

A fourth aspect of the invention is directed to an image processing method that executes image processing of objective image data, which is laid out on ornamental image data. The image processing method of the fourth aspect of the invention includes obtaining the ornamental image data; analyzing the obtained ornamental image data to acquire an image quality characteristic of the ornamental image data; acquiring an image quality characteristic specification indicator for specifying a tendency of the image quality characteristic of the ornamental image data; computing a correction rate of the objective image data from the acquired image quality characteristic specification indicator and the acquired image quality characteristic of the ornamental image data; obtaining the objective image data, which is to be laid out in a layout location of the ornamental image data; obtaining layout control information, which is related to the ornamental image data and specifies a layout location and layout dimensions of the objective image data to be laid out on the ornamental image data; adjusting image quality of the objective image data, based on the computed correction rate; and combining the image quality-adjusted objective image data with the ornamental image data according to the layout control information, so as to generate output image data.

The image processing method of the fourth aspect of the invention analyzes the obtained ornamental image data to acquire the image quality characteristic of the ornamental image data, and computes the correction rate of the objective image data from the image quality characteristic specification indicator and the acquired image quality characteristic. The image processing method adjusts the image quality of the objective image data based on the computed correction rate and generates output image data as the combination of the image quality-adjusted objective image data and the ornamental image data according to the layout control information. This arrangement ensures image quality adjustment of the objective image data to attain good image quality balance between the ornamental image data and the objective image data.

A fifth aspect of the invention is directed to an image processing method that executes image processing of objective image data, which is laid out on ornamental image data. The image processing method of the fifth aspect of the invention includes obtaining the ornamental image data; analyzing the obtained ornamental image data to acquire a statistical value of an image quality-relating parameter regarding image quality of the ornamental image data; obtaining the objective image data, which is to be laid out in a layout location of the ornamental image data; obtaining layout control information, which is related to the ornamental image data and specifies a layout location and layout dimensions of the objective image data to be laid out on the ornamental image data; adjusting image quality of the objective image data, based on the acquired statistical value; and combining the image quality-adjusted objective image data with the ornamental image data according to the layout control information, so as to generate output image data.

The image processing method of the fifth aspect of the invention analyzes the obtained ornamental image data to acquire the statistical value of the image quality-relating parameter representing the image quality of the ornamental image data. The image processing method adjusts the image quality of the objective image data based on the acquired statistical value and generates output image data as the combination of the image quality-adjusted objective image data and the ornamental image data according to the layout control information. This arrangement ensures image quality adjustment of the objective image data to attain good image quality balance between the ornamental image data and the objective image data.

In one preferable application of the fifth aspect of the invention, the image processing method further includes acquiring a reference value of the image quality-relating parameter for specifying a tendency of image quality characteristic of the ornamental image data; computing a correction rate of the image quality-relating parameter of the objective image data from the acquired reference value of the image quality-relating parameter and the acquired statistical value of the image quality-relating parameter of the ornamental image data; and executing image quality adjustment of the objective image data, based on the computed correction rate of the image quality-relating parameter, instead of the acquired statistical value. This arrangement enables image quality adjustment of the objective image data by taking into account the tendency of image quality of the ornamental image data.

In the image processing method of any of the third through the fifth applications of the invention, the adjusting the image quality of the objective data is implemented by adjusting the image quality of the objective image data to make an image quality tendency of the objective image data different from an image quality tendency of the ornamental image data. This arrangement enhances the difference in image quality between the ornamental image data and the objective image data and makes an objective image sufficiently highlighted against an ornamental image in a resulting output image.

In the image processing method of any of the third through the fifth applications of the invention, the adjusting the image quality of the objective image data is implemented by adjusting the image quality of the objective image data to make an image quality tendency of the objective image data similar to or identical with an image quality tendency of the ornamental image data. This arrangement reduces or completely eliminates the difference in image quality between the ornamental image data and the objective image data and makes an objective image in good harmony with an ornamental image in a resulting output image.

A sixth aspect of the invention is directed to an image quality adjustment information generation device that generates image quality adjustment information with regard to objective image data, which is laid out on ornamental image data. The image quality adjustment information generation device of the sixth aspect of the invention includes: an ornamental image data acquisition module that obtains the ornamental image data; an image quality characteristic acquisition module that analyzes the obtained ornamental image data to acquire an image quality characteristic of the ornamental image data; and a writing module that writes the acquired image quality characteristic into layout control information, which is related to the ornamental image data and specifies a layout location and layout dimensions of the objective image data to be laid out on the ornamental image data.

The image quality adjustment information generation device of the sixth aspect of the invention attains the similar functions and the effects to those of the image quality adjustment information generation method of the first aspect of the invention. The various arrangements of the image quality adjustment information generation method in the first aspect of the invention may be adopted in the image quality adjustment information generation device in the sixth aspect of the invention.

A seventh aspect of the invention is directed to an image quality adjustment information generation device that generates image quality adjustment information with regard to objective image data, which is laid out on ornamental image data. The image quality adjustment information generation device of the seventh aspect of the invention includes: an ornamental image data acquisition module that obtains the ornamental image data; a statistical value acquisition module that analyzes the obtained ornamental image data to acquire a statistical value of an image quality-relating parameter regarding image quality of the ornamental image data; and a writing module that writes the acquired statistical value into layout control information, which is related to the ornamental image data and specifies a layout location and layout dimensions of the objective image data to be laid out on the ornamental image data.

The image quality adjustment information generation device of the seventh aspect of the invention attains the similar functions and the effects to those of the image quality adjustment information generation method of the second aspect of the invention. The various arrangements of the image quality adjustment information generation method in the second aspect of the invention may be adopted in the image quality adjustment information generation device in the seventh aspect of the invention.

An eighth aspect of the invention is directed to an image processing device that executes image processing of objective image data, which is laid out on ornamental image data. The image processing device of the eighth aspect of the invention includes: an ornamental image data acquisition module that obtains the ornamental image data; an objective image data acquisition module that obtains the objective image data, which is to be laid out in a layout location of the ornamental image data; a layout control information acquisition module that obtains layout control information, which is related to the ornamental image data, specifies a layout location and layout dimensions of the objective image data to be laid out on the ornamental image data, and includes description of an image quality characteristic representing an image quality tendency of the ornamental image data; an image quality adjustment module that adjusts image quality of the objective image data, based on the image quality characteristic described in the obtained layout control information; and an output image data generation module that combines the image quality-adjusted objective image data with the ornamental image data according to the layout control information, so as to generate output image data.

The image processing device of the eighth aspect of the invention attains the similar functions and the effects to those of the image processing method of the third aspect of the invention. The various arrangements of the image processing method in the third aspect of the invention may be adopted in the image processing device in the eighth aspect of the invention.

A ninth aspect of the invention is directed to an image processing device that executes image processing of objective image data, which is laid out on ornamental image data. The image processing device of the ninth aspect of the invention includes: an ornamental image data acquisition module that obtains the ornamental image data; an image quality characteristic acquisition module that analyzes the obtained ornamental image data to acquire an image quality characteristic of the ornamental image data; an image quality characteristic specification indicator acquisition module that acquires an image quality characteristic specification indicator for specifying a tendency of the image quality characteristic of the ornamental image data; a correction rate computation module that computes a correction rate of the objective image data from the acquired image quality characteristic specification indicator and the acquired image quality characteristic of the ornamental image data; an objective image data acquisition module that obtains the objective image data, which is to be laid out in a layout location of the ornamental image data; a layout control information acquisition module that obtains layout control information, which is related to the ornamental image data and specifies a layout location and layout dimensions of the objective image data to be laid out on the ornamental image data; an image quality adjustment module that adjusts image quality of the objective image data, based on the computed correction rate; and an output image data generation module that combines the image quality-adjusted objective image data with the ornamental image data according to the layout control information, so as to generate output image data.

The image processing device of the ninth aspect of the invention attains the similar functions and the effects to those of the image processing method of the fourth aspect of the invention. The various arrangements of the image processing method in the fourth aspect of the invention may be adopted in the image processing device in the ninth aspect of the invention.

A tenth aspect of the invention is directed to an image processing device that executes image processing of objective image data, which is laid out on ornamental image data. The image processing device of the tenth aspect of the invention includes: an ornamental image data acquisition module that obtains the ornamental image data; a statistical value acquisition module that analyzes the obtained ornamental image data to acquire a statistical value of an image quality-relating parameter regarding image quality of the ornamental image data; an objective image data acquisition module that obtains the objective image data, which is to be laid out in a layout location of the ornamental image data; a layout control information acquisition module that obtains layout control information, which is related to the ornamental image data and specifies a layout location and layout dimensions of the objective image data to be laid out on the ornamental image data; an image quality adjustment module that adjusts image quality of the objective image data, based on the acquired statistical value; and an output image data generation module that combines the image quality-adjusted objective image data with the ornamental image data according to the layout control information, so as to generate output image data.

The image processing device of the tenth aspect of the invention attains the similar functions and the effects to those of the image processing method of the fifth aspect of the invention. The various arrangements of the image processing method in the fifth aspect of the invention may be adopted in the image processing device in the tenth aspect of the invention.

The methods in the first through the fifth applications of the invention may be actualized by programs, as well as by computer readable recording media in which such programs are recorded.

DETAILED DESCRIPTION OF THE PREFERRED EMBODIMENTS

The image quality adjustment information generation device, the image processing device, the image quality adjustment information generation method, and the image processing method of the invention are described below as preferred embodiments with reference to the attached drawings.

First Embodiment

Figure 1:
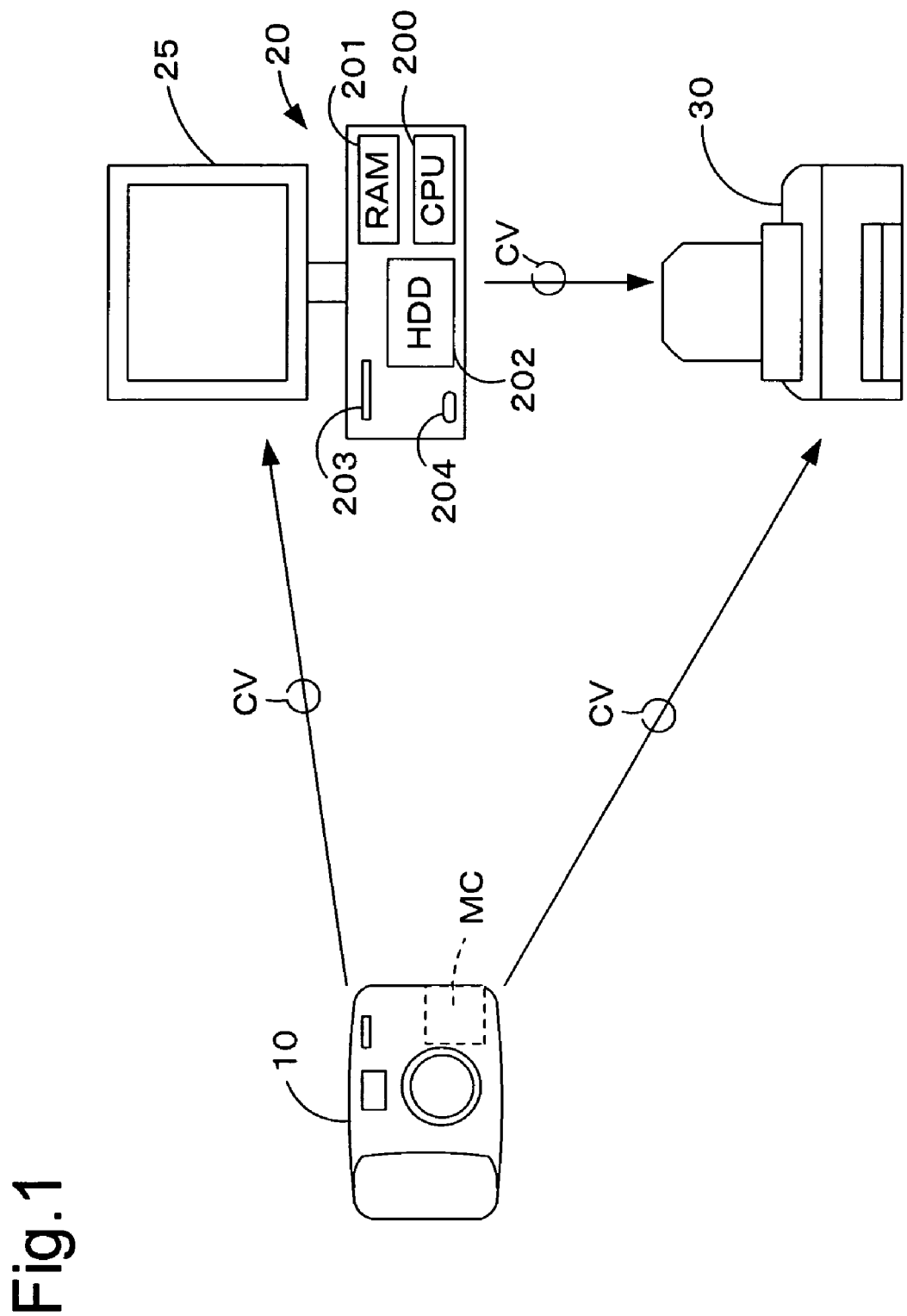
FIG. 1 schematically illustrates the configuration of an image processing system including an image processing device in a first embodiment of the invention.

An image processing system including an image quality adjustment information generation device of a first embodiment is described below with reference to FIG. 1. FIG. 1 schematically illustrates the configuration of the image processing system including the image quality adjustment information generation device of the first embodiment.

The image processing system includes a digital still camera 10 functioning as an input device to generate image data, a personal computer 20 functioning as the image quality adjustment information generation device to write image quality adjustment information, which is used for image quality adjustment of image data GD, into ornamental image data FD, and a color printer 30 functioning as an output device to output an image corresponding to output image data. The digital still camera 10 may have the image quality adjustment information generation functions of the personal computer 20. The output device is not restricted to the color printer 30 but may be a monitor 25, such as a CRT display or an LCD display, or a projector. In the description below, the color printer 30 connected with the personal computer 20 is used as the output device.

The personal computer 20 is a general computer and includes a central processing unit (CPU) 200, a random access memory (RAM) 201 that temporarily stores various data including input image data and results of operations, and a hard disk drive (HDD) 202 (or a read only memory (ROM)) that stores programs executed by the CPU 200 as described in respective embodiments and reference tables. The personal computer 20 additionally has a memory card slot 203 to receive a memory card MC inserted therein and input and output terminals 204 connected with connection cables from, for example, the digital still camera 10.

In an image quality adjustment information generation process executed by the personal computer 20 of this embodiment, the CPU 200 analyzes ornamental image data FD and obtains image quality characteristics (characteristic values or statistical values) of image quality adjustment parameters of the ornamental image data FD. The CPU 200 then sets correction rates of the image quality adjustment parameters for image data GD, based on the obtained characteristic values of the ornamental image data FD, and writes the obtained characteristic values or statistical values or the computed correction rates of the image quality adjustment parameters into layout control information LI. In the specification hereof, the image quality adjustment parameters represents parameters determining the image quality, for example, the contrast and the brightness. The image quality adjustment parameters are not intrinsic to the ornamental image data FD or the image data GD but are common to these data. The respective data may have different characteristic values or different correction rates of the image quality adjustment parameters. The procedure of this embodiment sets the correction rates of the image quality adjustment parameters for the image data GD, based on the characteristic values of the image quality adjustment parameters of the ornamental image data FD.

The digital still camera 10 focuses light information on a digital device (a photoelectric conversion element, such as a CCD or a photoelectron multiplier) to take an image. The digital still camera 10 includes a photoelectric conversion circuit with a CCD to convert light information into electric information, an image acquisition circuit to control the photoelectric conversion circuit and obtain a digital image, and an image processing circuit to process the obtained digital image.

The digital still camera 10 stores the obtained digital image in the form of digital image data into the memory card MC as a storage device. The JPEG format for lossy compression storage and the TIFF format for lossless compression storage are typically used to store image data taken by the digital still camera 10, although other storage formats, such as RAW format, GIF format, and BMP format may be adoptable.

The digital still camera 10 writes imaging information, which is set at each time of imaging and describes imaging conditions, and image processing control information GI, which is stored in advance in a memory (for example, a ROM) of the digital still camera 10, into a header of image data in the process of generation of the image data and stores the generated image data into the memory card MC. The digital still camera 10 also stores ornamental image data FD, which gives some design effect to objective image data GD, and layout control information LI, which specifies a layout location and layout dimensions of each objective image data GD to be laid out on the ornamental image data FD and is related to the ornamental image data FD, in its memory and writes the ornamental image data FD and the layout control information LI together with the generated image data into the memory card MC. The ornamental image data FD is, for example, frame image data or album mounting image data on which multiple objective image data are pasted, and may be generated in the form of bitmap data or vector data. As mentioned above, the digital still camera 10 may execute the image quality adjustment information generation process, instead of the personal computer 20.

The layout control information LI has a script specifying the layout location and the layout dimensions of each objective image data GD to be laid out on the ornamental image data FD. In the description below, each objective image data specified as a layout object is image data taken by an imaging device. The objective image data of the layout object is, however, not restricted to the image data taken by the imaging device but may be any image data mountable on the ornamental image data FD, for example, image data generated by computer graphics. The layout control information LI may additionally have information on the image quality characteristics, for example, the characteristic values or the statistical values, of the ornamental image data FD or the correction rates of the image quality adjustment parameters set based on the image quality characteristics, which may be written by the personal computer 20 or may be stored in advance. The image processing control information GI includes experimentally obtained pieces of information that enable a selected output device to give a desired output result of an image corresponding to image data generated by any selected image data generation device, such as the digital still camera 10. The image processing control information GI includes the settings of respective parameters for specifying image quality adjustment conditions according to the combination of the digital still camera 10 and the selected output device (for example, the printer 30).

The image data GD generated by the digital still camera 10 is sent to the color printer 30 via a cable CV and the computer 20 or via only a cable CV. The image data GD (image file GF) taken by the digital still camera 10 may otherwise be stored in the memory card MC and given to the color printer 30 from the memory card MC, which is inserted into the memory card slot of the personal computer 20 or is directly connected to the color printer 30.

The color printer 30 is capable of outputting color images and is, for example, an inkjet printer that ejects four color inks, cyan (C), magenta (M), yellow (Y), and black (K), onto a printing medium to create a dot pattern and thereby form an image. The color printer 30 may be an electrophotographic printer that transfers and fixes color toners on a printing medium to form an image. Other color inks, light cyan (LC), light magenta (LM), and dark yellow (DY), may be used in addition to the above four color inks.

Image Quality Adjustment Information Generation Process by Personal Computer 20

Figure 2:
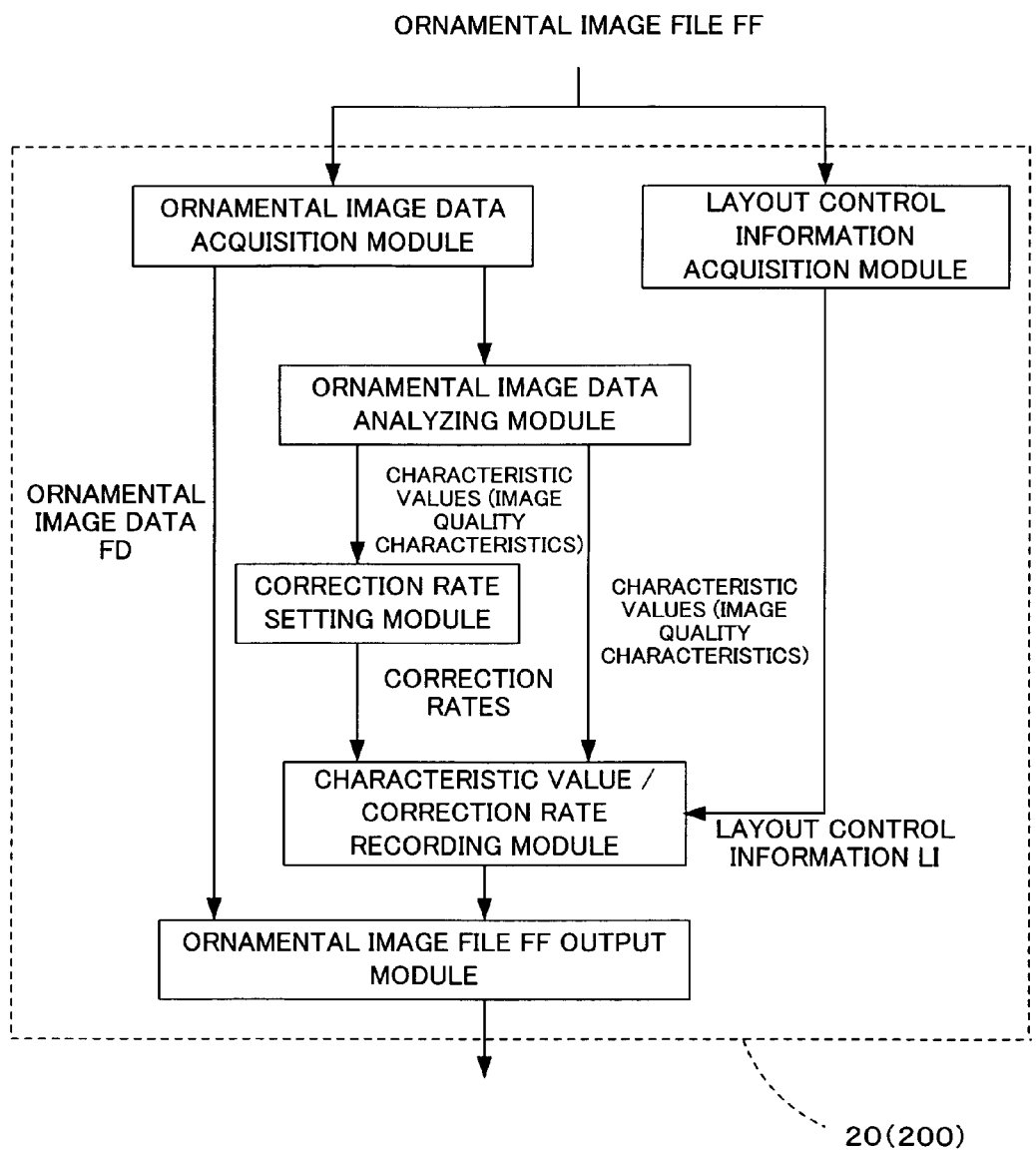
FIG. 2 is a functional block diagram showing the functions of a personal computer 20 (CPU 200) in the first embodiment.

The functional configuration of the personal computer 20 (CPU 200) is described with reference to FIG. 2. FIG. 2 is a functional block diagram showing the functions of the personal computer 20 (CPU 200) in the first embodiment.

In the personal computer 20 (the CPU 200), an ornamental image data acquisition module reads desired ornamental image data FD from an ornamental image file FF, which includes the ornamental image data FD and related layout control information LI. A layout control information acquisition module obtains layout control information. When the obtained layout control information does not describe characteristic values (information on image quality characteristics), an ornamental image data analyzing module analyzes the ornamental image data and acquires characteristic values representing image quality tendencies (characteristics) of the ornamental image data. In the CPU 200, a correction rate setting module computes and sets correction rates of the image quality adjustment parameters of the image data GD, which is to be laid out on the ornamental image data FD, based on the acquired characteristic values.

In the CPU 200, a characteristic value/correction rate recording module writes the acquired characteristic values and the settings of the correction rates into the layout control information LI. The layout control information LI including the characteristic values and the correction rates is combined with the ornamental image data FD in an ornamental image file FF, which is output from an ornamental image file output module.

Figure 3:
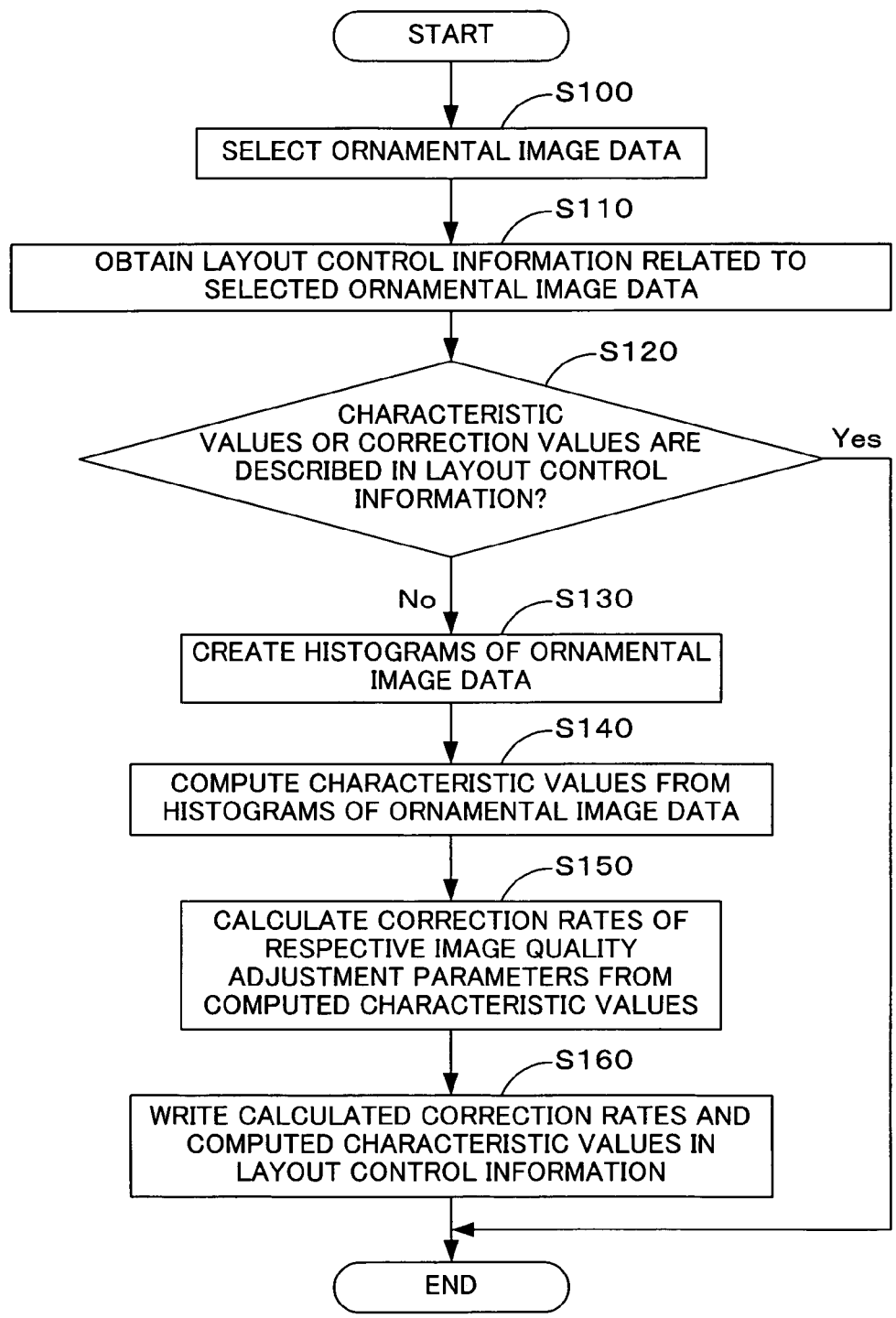
FIG. 3 is a flowchart showing an image processing routine executed by the personal computer 20 in the first embodiment.
Figure 4:
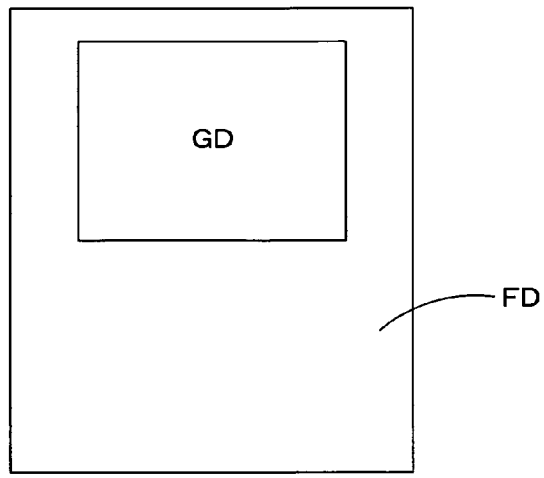
FIG. 4 shows an image of ornamental image data as an example.
Figure 5:
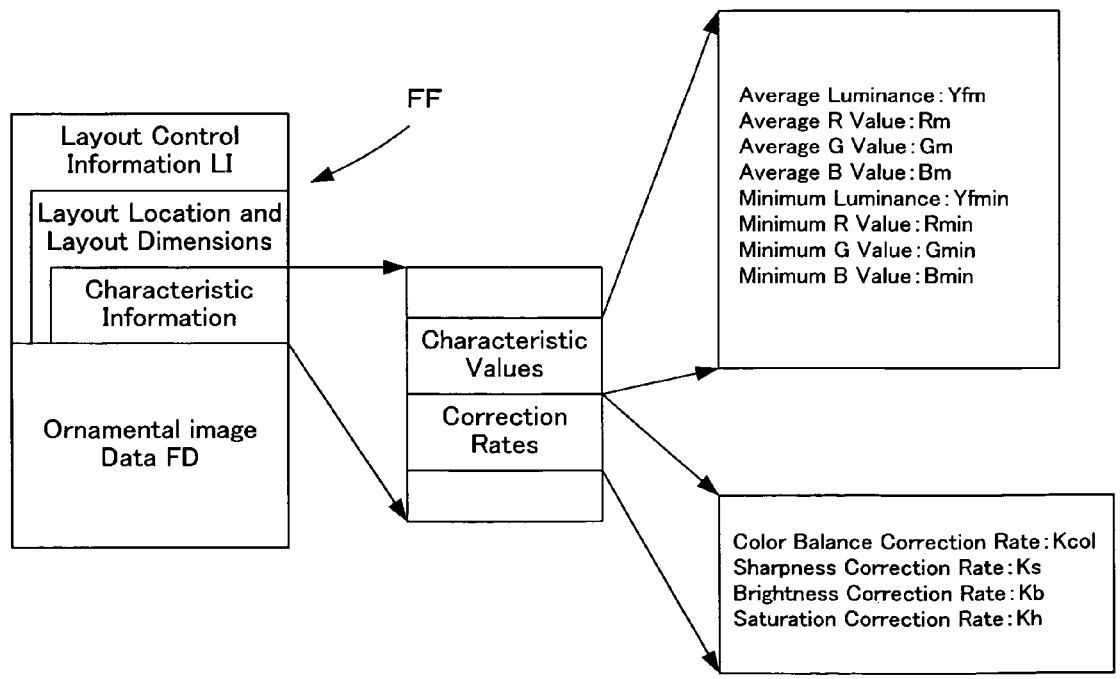
FIG. 5 shows the file structure of an ornamental image file FF including ornamental image data FD and layout control information LI.
Figure 6:
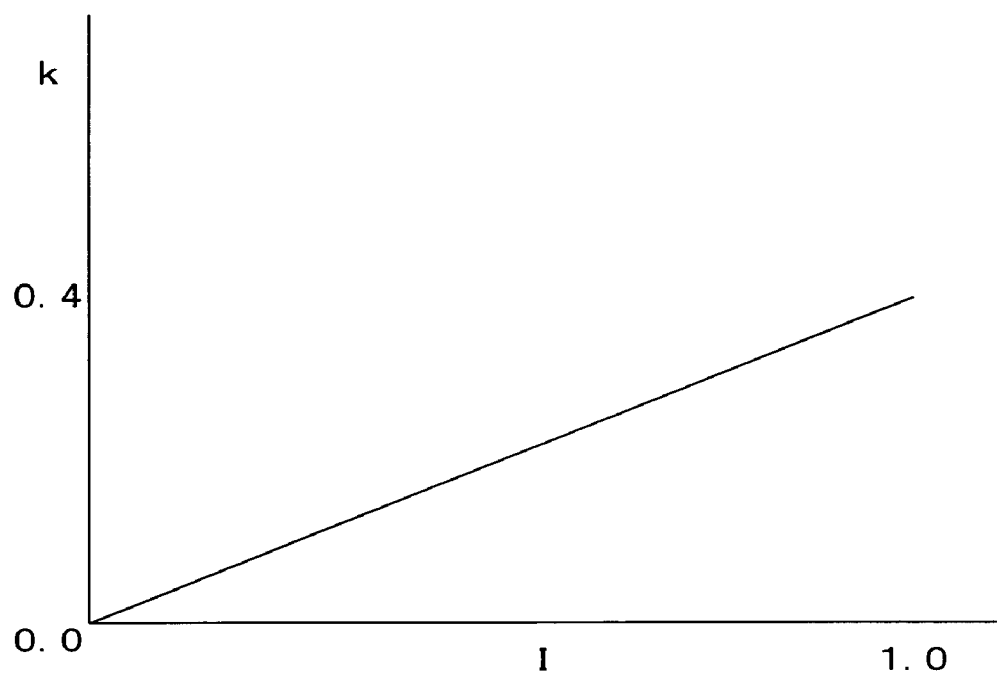
FIG. 6 is a map used to set various correction rates K corresponding to a color distribution characteristic value I of the ornamental image data FD.
Figure 7:
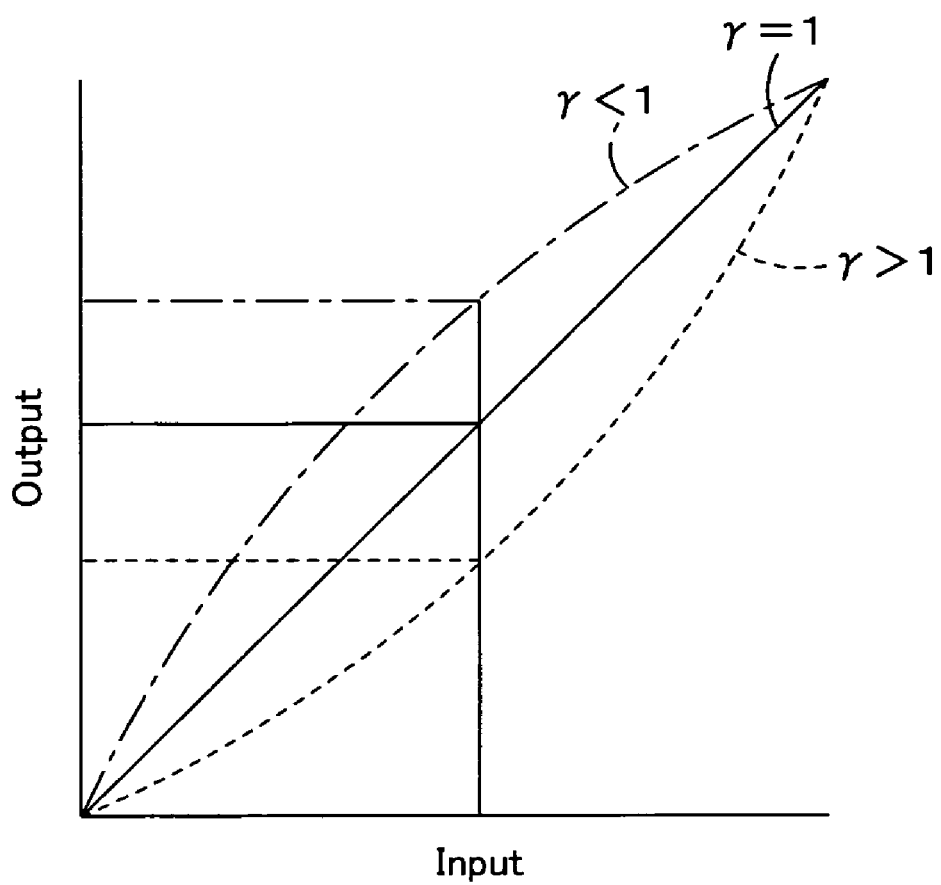
FIG. 7 shows variations in output value against input value of a correction rate of a brightness parameter.

The image quality adjustment information generation process executed by the personal computer 20 in the first embodiment is described with reference to FIGS. 3 through 7. FIG. 3 is a flowchart showing an image processing routine executed by the personal computer 20 in the first embodiment. FIG. 4 shows an image of ornamental image data as an example. FIG. 5 shows the file structure of an ornamental image file FF including ornamental image data FD and layout control information LI, as well as an example of characteristic values and correction rates included in the layout control information LI. FIG. 6 is a map used to set various correction rates K corresponding to a color distribution characteristic value I of the ornamental image data FD. FIG. 7 shows variations in output value against input value of a brightness correction rate Kb. The image of the ornamental image data FD conceptually shows the state of expansion on an image buffer. The file structure of each file conceptually shows the state of storage in a memory.

The image quality adjustment information generation process of this embodiment may be triggered by selection of desired ornamental image data FD (ornamental image file FF) in the personal computer 20 or by selection of desired ornamental image data FD in the digital still camera 10. The image quality adjustment information generation process may otherwise be executed in response to the user's command given through the operation of a keyboard.

When the image quality adjustment information generation process starts, the personal computer 20 (CPU 200) first selects ornamental image data FD and temporarily stores the selected ornamental image data FD in the RAM 201 (step S100). The ornamental image data FD may be selected on the digital still camera 10 connected with the personal computer 20 via the connection cable CV, may be selected among a number of ornamental image data stored in advance in the HDD 202 of the personal computer 20 through the operations of the keyboard, or may be selected via a network. The ornamental image data FD may include plural layout locations to paste multiple image data GD thereon. In this embodiment, however, for the simplicity of explanation, it is assumed that single (one) image data GD is pasted on ornamental image data FD having only one layout location.

The ornamental image data FD has, for example, a form shown in FIG. 4 in a resulting output image (in expansion on an image buffer). The ornamental image data FD has one or multiple layout locations, on which image data GD are respectively pasted.

The ornamental image data FD may be transmitted together with the layout control information LI in the form of an ornamental image file FF or may be transmitted in the individual form related to the layout control information LI. The ornamental image file FF has, for example, the file structure of FIG. 5. The layout control information LI includes layout location information (for example, coordinate information) on the layout location to paste image data GD thereon and information regarding the layout dimensions (resized dimensions) of the image data GD on the layout location. The layout control information LI may have an additional area for storage of characteristic information representing the image quality tendencies or characteristics of the ornamental image data FD.

The layout control information LI further includes α channel data, which is used to regulate tone values (R, G, and B tone data) of upper image data (for example, ornamental image data FD) located on an upper side in a resulting composite image relative to those of lower image data (for example, image data GD) located on a lower side and thereby determine the transparency of the lower image data against the upper image data. For example, the α channel data applies a coefficient α to the R, G, and B tone data of the upper image data, while applying a coefficient (1−α) to the R, G, and B tone data of the lower image data. The α channel data set equal to 255 shows no appearance of the lower image data (opaque) in a resulting composite image, whereas the α channel data set equal to 0 shows perfect appearance of the lower image data (transparent) in a resulting composite image. Semi-transparent design effects are given by setting the α channel data in a range of 0 to 255.

The CPU 200 then obtains the layout control information LI related to the selected ornamental image data FD (step S110) and determines whether the layout control information LI includes description of either a characteristic value or a correction rate (step S120). When either the characteristic value or the correction rate is described in the layout control information LI (step S120: Yes), the CPU 200 does not require analysis of the ornamental image data FD to acquire either the characteristic value or the correction rate and thus immediately exits from this image quality adjustment information generation process.

When neither the characteristic value nor the correction rate is described in the layout control information LI (step S120: No), the CPU 200 analyzes the obtained ornamental image data FD to create histograms (step S130). The concrete procedure scans multiple pixel data of the ornamental image data FD in units of pixels or at adequate pixel intervals (selected part of pixels) and creates histograms with regard to the respective color components R, G, and B and the Y (luminance) component.

The CPU 200 computes characteristic values (statistic values), such as the average value, the minimum value, the maximum value, the median, and the variance, with regard to the respective color components R, G, and B and the Y (luminance) component from their histograms (step S140). The CPU 200 then calculates correction rates of respective image quality adjustment parameters from the computed characteristic values (step S150).

The image quality adjustment parameters represent parameters affecting the image quality including the contrast, the brightness (luminance), the color balance, the saturation, and the sharpness. The concrete procedure of calculating the correction rate of each image quality adjustment parameter compares the computed characteristic value with a preset reference value and detects an image quality tendency of the ornamental image data FD. The image quality tendency of the ornamental image data FD is an indicator used for classification of the ornamental image data FD and is expressed as, for example, brighter or darker, reddish, bluish, or greenish, higher saturation or lower saturation, higher sharpness or lower sharpness relative to the preset reference value.

With regard to the parameter 'contrast', the procedure detects a shadowing point and a highlighting point from the histogram of the luminance component of the ornamental image data FD and compares the detected shadowing point and highlighting point with preset reference values of the shadowing point and the highlighting point to determine whether the ornamental image data FD has a high contrast or a low contrast. In the case of a high-contrast ornamental image data FD, the procedure sets the correction rates of the shadowing point and the highlighting point to narrow the histogram of the luminance component of the image data GD. In the case of a low-contrast ornamental image data FD, on the other hand, the procedure sets the correction rates of the shadowing point and the highlighting point to extend the histogram of the luminance component of the image data GD. This ensures image quality adjustment of enhancing the contrast between the image data GD and the ornamental image data FD, thus making the image data GD highlighted against the ornamental image data FD.

With regard to the parameter 'color balance', the procedure analyzes the color balance from the histograms of the color components R, G, and B of the ornamental image data FD and determines the color tendency (representative color) of the ornamental image data FD. The procedure sets the correction rates of the respective color components R, G, and B to correct the color balance of the image data GD, based on the determined representative color. The correction rates are used to vary offsets of corresponding tone curves.

The concrete procedure reads medians of the respective color components R, G, and B from the created histograms and sets the combination of the medians to the representative color Fc (Rm,Gm,Bm) of the ornamental image data FD.

(1) In the Case of Rm>Gm, Bm (Rather Reddish Ornamental Image Data FD)

The procedure reads a correction rate Kcol for reducing the color component R of the image data GD corresponding to a characteristic value I, which is obtained by Equation (1) given below, from the graph of FIG. 6, where $0 \leq k(=Kcol) \leq 0.4$:

$$I=(Rm-(Gm+Bm)/2)/Rm \tag{1}$$

The correction rate Kcol is used in Equation (2) given below, where Ra denotes an original value of the R component of the image data GD and Rc denotes a corrected value of the R component:

$$Rc=Ra(1-Kcol) \tag{2}$$

Setting the correction rate in this manner reduces the color component R and gives a total color balance of the image data GD with the relatively weakened color component R (red component) and the relatively enhanced color components G and B. Such correction enables the image data GD with the relatively weak R component to be pasted on the ornamental image data FD with the relatively strong R component and accordingly enhances the color contrast between the image data GD and the ornamental image data FD, thus giving a resulting output image including an objective image sufficiently highlighted against an ornamental image.

(2) In the Case of Gm>Rm, Bm (Rather Greenish Ornamental Image Data FD)

The procedure reads a correction rate Kcol for reducing the color component G of the image data GD corresponding to a characteristic value I, which is obtained by Equation (3) given below, from the graph of FIG. 6, where $0 \leq k(=Kcol) \leq 0.4$:

$$I=(Gm-(Rm+Bm)/2)/Gm \tag{3}$$

The correction rate Kcol is used in Equations (4) and (5) given below, where Ra and Ba denote original values of the R and B components of the image data GD and Rc and Bc denote corrected values of the R and B components:

$$Rc=Ra(1+Kcol) \tag{4}$$

$$Bc=Ba(1+Kcol) \tag{5}$$

Setting the correction rates in this manner increases the color components R and B and thereby gives a total color balance of the image data GD with the relatively enhanced color components R and B and the relatively weakened color component G (green component). Such correction enables the image data GD with the relatively weak G component to be pasted on the ornamental image data FD with the relatively strong G component and accordingly enhances the color contrast between the image data GD and the ornamental image data FD, thus giving a resulting output image including an objective image sufficiently highlighted against an ornamental image.

(3) In the Case of Bm>Rm, Gm (Rather Bluish Ornamental Image Data FD)

The procedure reads a correction rate Kcol for reducing the color component B of the image data GD corresponding to a characteristic value I, which is obtained by Equation (6) given below, from the graph of FIG. 6, where $0 \leq k(=Kcol) \leq 0.4$:

$$I=(Bm-(Rm+Gm)/2)/Bm \tag{6}$$

The correction rate Kcol is used in Equation (7) given below, where Ba denotes an original value of the B component of the image data GD and Bc denotes a corrected value of the B component:

$$Bc=Ba(1-Kcol) \tag{7}$$

Setting the correction rate in this manner reduces the color component B and gives a total color balance of the image data GD with the relatively weakened color component B (blue component) and the relatively enhanced color components R and G. Such correction enables the image data GD with the relatively weak B component to be pasted on the ornamental image data FD with the relatively strong B component and accordingly enhances the color contrast between the image data GD and the ornamental image data FD, thus giving a resulting output image including an objective image sufficiently highlighted against an ornamental image.

With regard to the parameter 'brightness', the procedure reads an average luminance Yfm of the ornamental image data FD from the histogram of the luminance component and calculates a correction rate Kb from the average luminance Yfm according to Equation (8) given below:

$$Kb=((Yfm-Th)*k)/Th\ \gamma=1+Kb \qquad (8)$$

where Th denotes a threshold value for determining the brightness of the ornamental image data FD and k denotes a constant. The luminance contrast increases with an increase in constant k.

Under the condition of Yfm>Th, that is, in the case of bright ornamental image data FD, the correction rate γ becomes greater than 1. This modifies the characteristic of the tone curve to decrease the output level against the input level as shown in FIG. 7 to darken the image data GD. Under the condition of Yfm<Th, that is, in the case of dark ornamental image data FD, on the other hand, the correction rate γ becomes less than 1. This modifies the characteristic of the tone curve to increase the output level against the input level as shown in FIG. 7 to brighten the image data GD.

With regard to the parameter 'saturation', the procedure analyzes a saturation distribution of the ornamental image data FD and determines whether the ornamental image data FD has a higher saturation or a lower saturation than a preset reference value. In the case of the ornamental image data FD of high saturation, the procedure sets a correction rate Kh of the saturation parameter of the image data GD to reduce the saturation of the image data GD. In the case of the ornamental image data FD of low saturation, on the other hand, the procedure sets the correction rate Kh of the saturation parameter of the image data GD to enhance the saturation of the image data GD. This ensures image quality adjustment of enhancing the saturation contrast between the image data GD and the ornamental image data FD, thus making the image data GD highlighted against the ornamental image data FD.

With regard to the parameter 'sharpness', the procedure analyzes a distribution of edge enhancement against frequency of the ornamental image data FD and compares the result of the analysis with a preset reference value of sharpness to determine the sharpness level of the ornamental image data FD. The procedure sets an application level (correction rate) Ks of sharpness or an application level (correction rate) Ks of an unsharp mask to the image data GD according to the determined sharpness level. In the case of the ornamental image data FD of high sharpness, the procedure decreases the application level of the unsharp mask to the image data GD to lower the sharpness of the image data GD. In the case of the ornamental image data FD of low sharpness, on the other hand, the procedure increases the application level of the unsharp mask to the image data GD to enhance the sharpness of the image data GD. This ensures image quality adjustment of enhancing the sharpness contrast between the image data GD and the ornamental image data FD, thus making the image data GD highlighted against the ornamental image data FD.

The CPU 200 writes at least either of the calculated correction rates and the computed characteristic values with regard to the respective image quality adjustment parameters in the layout control information LI (step S160) and terminates the image quality adjustment information generation process. When the layout control information LI is included in the header of the ornamental image data FD or is part of the ornamental image file FF, the characteristic values and the correction rates may be described in the layout control information LI as shown in FIG. 5.

As described above, the personal computer 20 as the image quality adjustment information generation device of the first embodiment analyzes the image quality tendencies of the ornamental image data FD and generates image quality adjustment information of the image data GD based on the result of the analysis. The image quality adjustment information is obtained as the image quality characteristics (characteristic values, statistical values) of the ornamental image data FD and is described in the layout control information LI.

The image processing device then executes image quality adjustment of the image data GD with the characteristic values described in the layout control information LI and generates resulting output image data including the ornamental image data FD and the processed image data GD.

In the structure of the first embodiment, the personal computer 20 computes the correction rates of the respective image quality adjustment parameters of the image data GD to be laid out on the ornamental image data FD from the computed characteristic values of the ornamental image data FD, so as to generate image quality adjustment information. The correction rates of the respective image quality adjustment parameters computed as the image quality adjustment information are described in the layout control information LI.

The image quality tendencies of the image data GD pasted on the ornamental image data FD are adjustable according to the layout control information LI related to the ornamental image data FD. The correction rates of the respective image quality adjustment parameters of the image data GD may be set to have different image quality tendencies from those of the ornamental image data FD. This gives an output result including an objective image highlighted against an ornamental image. The correction rates of the respective image quality adjustment parameters of the image data GD may alternatively be set to have similar image quality tendencies to those of the ornamental image data FD. This gives an output result including an objective image in good harmony with an ornamental image.

Second Embodiment

Figure 8:
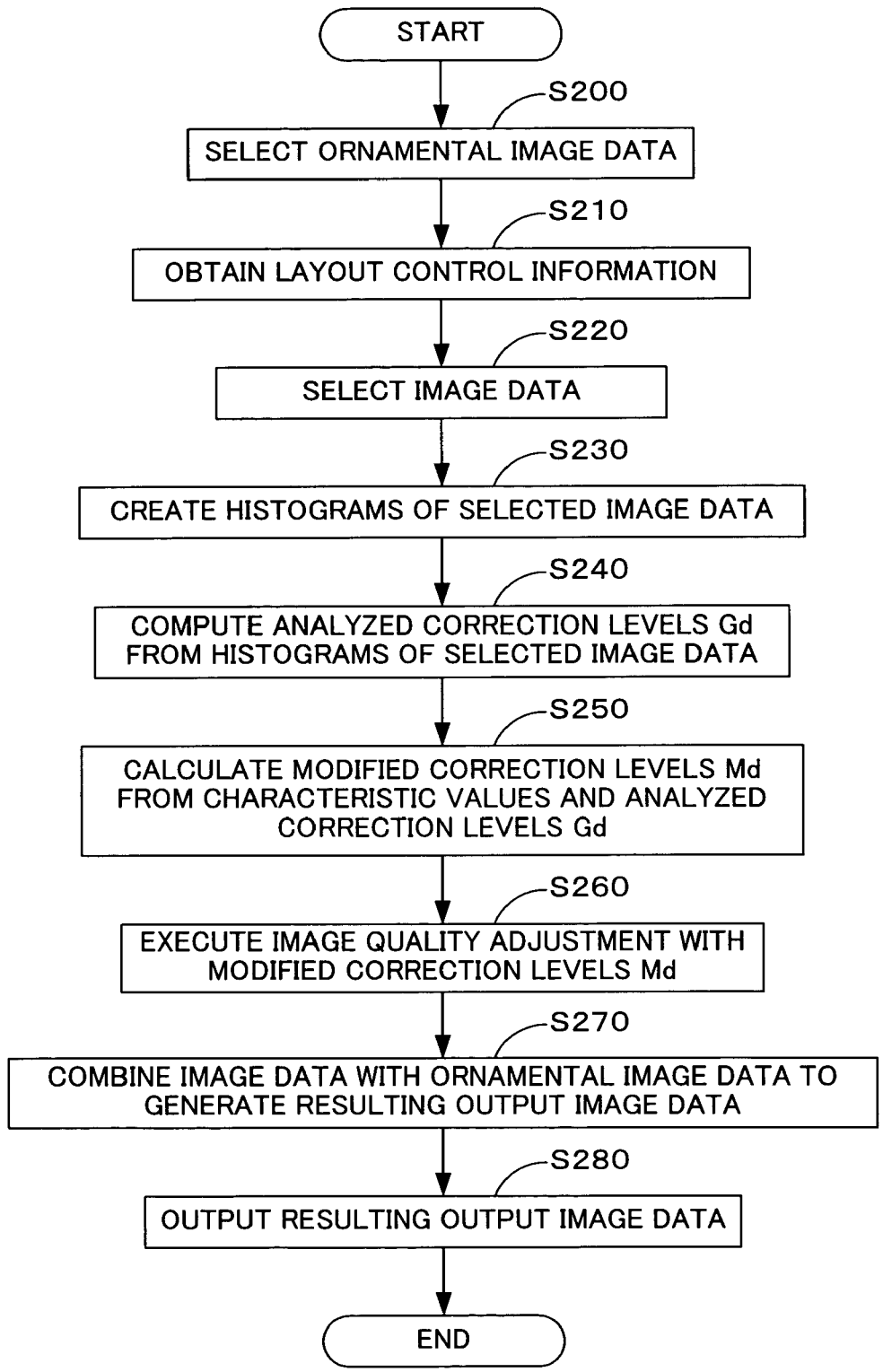
FIG. 8 is a flowchart showing an image processing routine executed by a personal computer as an image processing device in a second embodiment of the invention.
Figure 9:
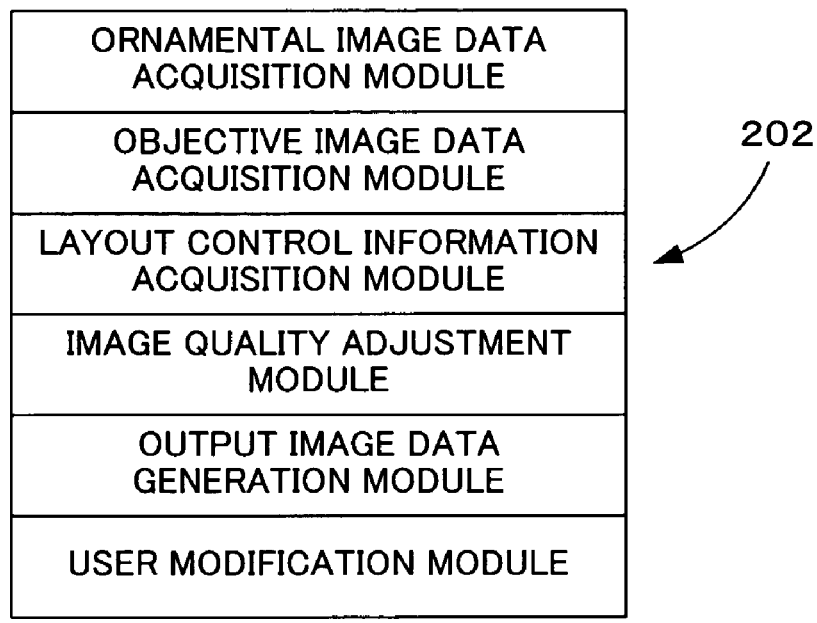
FIG. 9 shows respective functional modules stored in an HDD in the personal computer of the second embodiment.
Figure 10:
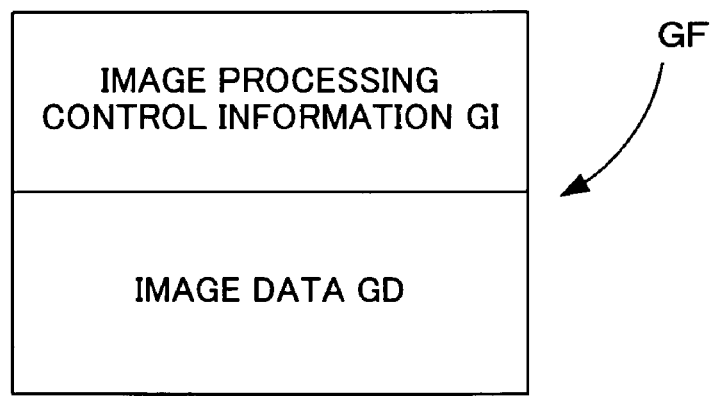
FIG. 10 shows the file structure of an image file including image data GD and image processing control information GI.

An image processing device and a corresponding image processing method in a second embodiment of the invention are described with reference to FIG. 1 and FIGS. 8 to 10. FIG. 8 is a flowchart showing an image processing routine executed by the personal computer as an image processing device of the second embodiment. FIG. 9 shows respective functional modules stored in the HDD 202 in the personal computer 20 of the second embodiment. FIG. 10 shows the file structure of an image file including image data GD and image processing control information GI. The structure of the personal computer as the image processing device of the second embodiment is identical with the structure of the personal computer 20 as the image quality adjustment information generation device of the first embodiment. The like elements are expressed by the like numerals and are not specifically described here. As shown in FIG. 9, the HDD 202 of the personal computer 200 includes an ornamental image data acquisition module that obtains selected ornamental image data, an objective image data acquisition module that obtains selected objective image data to be laid out on respective available layout locations of the selected ornamental image data, and a layout control information acquisition module that obtains layout control information, which is related to the ornamental image data and describes available layout locations and layout dimensions of the objective image data and image quality characteristics representing the image quality tendencies of the ornamental image data. The HDD 202 also includes an image quality adjustment module that adjusts the image quality of the objective image data by taking into account the image quality characteristics described in the obtained layout control information, and an output image data generation module that generates resulting output image data including the image quality-adjusted objective image data and the ornamental image data according to the layout control information. The CPU 200 executes these modules to attain the series of image processing described below. The HDD 202 may additionally include a user modification module that modifies the layout locations and the layout dimensions described in the layout control information in response to the user's demand.

The image processing of this embodiment may be activated by insertion of the memory card MC into the personal computer 20 or by connection of the digital still camera 10 to the personal computer 20 via the communication cable. The image processing may otherwise be triggered by the user's operation of a keyboard to give a start command.

When the image processing starts, the personal computer 20 (CPU 200) first selects ornamental image data FD and temporarily stores the selected ornamental image data FD in the RAM 201 (step S200). The ornamental image data FD may be selected on the digital still camera 10, may be selected among a number of ornamental image data stored in advance in the HDD 202 of the personal computer 20 through the operations of the keyboard, or may be selected via a network. The ornamental image data FD may include plural layout locations to paste multiple image data GD thereon. In this embodiment, however, for the simplicity of explanation, it is assumed that single (one) image data GD is pasted on ornamental image data FD having only one layout location.

The ornamental image data FD used in this embodiment has the layout control information LI, which includes layout location information (for example, coordinate information) on the layout location to paste image data GD thereon, information regarding the layout dimensions (resized dimensions) of the image data GD on the layout location, and at least either of characteristic values of the ornamental image data FD and correction rates of image quality adjustment parameters of the image data GD. The layout control information further includes a channel data.

The CPU 200 subsequently obtains layout control information LI related to the selected ornamental image data FD (step S210). In the structure of this embodiment, the ornamental image data FD and the layout control information LI are stored together in an ornamental image file FF. The layout control information LI is thus read from the ornamental image file FF, which includes the selected ornamental image data FD. The CPU 200 then selects desired image data GD and temporarily stores the selected image data GD into the RAM 201 (step S220). The image data GD may be selected on the digital still camera 10 or on the personal computer 20 through the operations of the keyboard. The typical procedure first selects (determines) desired ornamental image data FD and subsequently selects desired image data to be pasted in the layout location of the ornamental image data GD.

The CPU 200 analyzes the obtained image data GD and creates histograms of the image data GD with regard to the color components R, G, and B and the luminance component (step S230). The concrete procedure scans the image data GD in units of pixels to acquire statistical image values (characteristic values) representing characteristics of the image data FD with regard to image quality adjustment parameters. The image quality adjustment parameters include, for example, the contrast, the sharpness, and the color balance.

The personal computer 20 stores in advance preset reference values of the image quality adjustment parameters in the HDD 202. The CPU 200 sets correction rates of the image quality adjustment parameters of the image data GD, that is, analyzed correction levels (correction coefficients) Gd, to cancel out or at least reduce differences between the characteristic values and the corresponding preset reference values with regard to the respective image quality adjustment parameters (step S240).

The CPU 200 modifies the analyzed correction levels Gd with either the characteristic values or the correction rates K read from the layout control information LI and calculates modified correction levels Md (step S250). Image quality adjustment of the image data GD is executed with the modified correction levels Md thus calculated.

For example, an analyzed correction level Gy of the brightness parameter is set according to an equation given below from an average luminance Ygm of the image data GD, which is obtained from a luminance histogram, where Ys denotes the reference value of the brightness parameter:

$$Gy=Ygm/Ys$$

The CPU 200 calculates a modified correction level (correction coefficient) $\gamma(Md)$ of the brightness parameter from the average luminance Yfm, which is a characteristic value relating to the luminance of the ornamental image data FD, and the analyzed correction level Gy of the brightness parameter according to equations given below:

$$DY=(Yfm-Th)*k$$

$$\gamma=Gy+DY/Th$$

where Th denotes a threshold value for determining the brightness of the ornamental image data FD and k denotes a constant. The luminance contrast increases with an increase in constant k.

When the correction rate Kb of the brightness parameter is described in the layout control information LI, the modified correction level $\gamma$ is directly obtained by:

$$\gamma=GY+Kb$$

Image quality adjustment of the image data GD with the modified correction level $\gamma$ of the brightness parameter is executed according to tone curves (S curves) that respectively correlate the input levels to the output levels of the color components R, G, and B of the image data GD. An identical tone curve is applied to the respective color components R, G, and B:

$$R'=(R/255)^{\gamma}$$

$$G'=(G/255)^{\gamma}$$

$$B'=(B/255)^{\gamma}$$

This makes the input-output conversion with regard to the respective color components R, G, and B of the image data GD and thereby gives the image quality-adjusted image data GD. The modified correction level $\gamma$ of the brightness parameter greater than the analyzed brightness correction level Gy gives the lower output level against the input level and thereby decreases (lowers) the brightness of the image data GD. There is accordingly a high luminance contrast between the bright ornamental image data FD and the relatively dark image data GD. In a resulting output image, an objective image is not merged into an ornamental image but is sufficiently highlighted against the ornamental image.

The modified correction level γ of the brightness parameter less than the analyzed brightness correction level Gy, on the other hand, gives the higher output level against the input level and thereby increases (heightens) the brightness of the image data GD. There is accordingly a high luminance contrast between the dark ornamental image data FD and the relatively bright image data GD. In a resulting output image, an objective image is not merged into an ornamental image but is sufficiently highlighted against the ornamental image.

Correction rates of the respective color components R, G, and B, that is, analyzed correction levels Gc(Ra,Ga,Ba) of the color balance parameter, are set to cancel out or at least reduce differences between the characteristic values of the R, G, and B components obtained by the analysis and preset reference values of the R, G, and B components.

The analyzed correction levels Gc are modified with the color balance correction rates Kcol described in the layout control information LI to give modified correction levels Mc(Md) of the color balance parameter. Image quality adjustment of the image data GD with the modified color balance correction levels Mc is executed according to tone curves (S curves) that correlate input levels to output levels of the RGB color components of the image data GD. In the image quality adjustment with the tone curves, the modified color balance correction levels Mc(Rc,GcBc) are used to vary (offset) the tone curves of the R, G, and B color components. A specific point for application of the modified correction level is set experimentally on each tone curve with regard to each image quality adjustment parameter. The modified color balance correction level Mc is applied as an offset of the output level of the color balance against a value '0' of the input level. This varies the value of the tone curve at the preset specific point and accordingly changes the input-output characteristic of the tone curve. Application of the corrected tone curves with regard to the respective color components R, G, and B to the image data GD makes the input-output conversion with regard to the respective color components R, G, and B of the image data GD and thereby gives the image quality-adjusted image data GD.

The procedure sets analyzed correction levels of the other image quality adjustment parameters based on corresponding reference values and executes image quality adjustment (auto image quality adjustment) with modified correction levels as described briefly below.

With regard to the parameters 'contrast', 'shadowing', and 'highlighting', the procedure detects a shadowing point and a highlighting point from the image data GD, sets analyzed correction levels based on preset reference values of the shadowing point and the highlighting point, modifies the analyzed correction levels, and extends histograms with the modified correction levels. The procedure also sets an analyzed correction level corresponding to a standard deviation of luminance, modifies the analyzed correction level, and modifies (corrects) the tone curve with the modified correction level.

With regard to the parameter 'saturation', the procedure analyzes a saturation distribution of image data, sets an analyzed correction level based on a preset reference value, modifies the analyzed correction level, and enhances the saturation with the modified correction level. The image data of the lower saturation gives the higher enhancement level of saturation.

With regard to the parameter 'sharpness', the procedure analyzes a distribution of edge enhancement against frequency of image data, sets an application level (analyzed correction level) of an unsharp mask based on a preset reference value, modifies the analyzed correction level, and applies the unsharp mask with the modified correction level (modified application level) to implement the image quality adjustment. The reference value is set according to the frequency distribution. The higher frequency image data (for example, landscape) gives the smaller reference value, while the lower frequency image data (for example, portrait) gives the greater reference value. The application level of the unsharp mask depends upon the distribution of the edge enhancement. The image data having the greater indistinctiveness gives the greater application level.

On completion of the image quality adjustment of the image data GD, the CPU 200 combines the image data GD with the ornamental image data FD according to the layout control information LI to generate resulting output image data (step S270). One typical method of combining the image data GD with the ornamental image data FD is described.

The CPU 200 interprets the script of the layout control information LI describing the layout locations and the layout dimensions, determines the locations and the dimensions of the image data GD to be laid out on the ornamental image data FD based on the result of the interpretation, specifies the tone values of the ornamental image data FD according to the α channel data, and combines the image data GD with the ornamental image data FD. The CPU 200 resizes (contracts or expands) the dimensions of the image data GD according to the layout dimensions of the respective layout locations described in the script.

The CPU 200 applies the α channel data and sums up the R, G, and B values of the respective image data to calculate the R, G, and B values of resulting output image data. The α channel data is set equal to 0 to prevent interference of the ornamental image data FD with reproduction of the image data GD in the area of an image in a resulting output image (composite image). The α channel data is set equal to 255 to prohibit reproduction of the image data GD in the area of an ornamental image (an ornamental area or a frame area) in the resulting output image.

The layout location and the layout dimensions described in the layout control information LI may be varied, for example, in response to the user's entry via an input device of the personal computer 20. One possible modification of the image quality adjustment may detect the user's demand and change the image quality-adjusted image data according to the layout control information LI in response to the user's demand.

The CPU 200 outputs resulting output image data to a printer driver or a display driver (step S280) and terminates this image processing routine. The printer driver executes RGB to CMYK color conversion based on lookup tables, halftoning, and other required series of image processing and eventually sends the output image data with print control commands as raster data to the printer 30.

As described above, the personal computer 20 as the image processing device of the second embodiment executes image quality adjustment of the image data GD, which is to be laid out on the ornamental image data, with the image quality adjustment information described in the layout control information LI, that is, either the characteristic values of the ornamental image data FD or the correction rates K of the image data GD. When the layout control information LI includes the correction rates K to make the image quality tendencies of the image data GD different from those of the ornamental image data FD, a resulting output image has an enhanced difference in image quality between an objective image data and an ornamental image data, for example, an enhanced luminance contrast, color contrast, or saturation contrast. The objective image is thus sufficiently highlighted against the ornamental image data in the output result.

In the second embodiment discussed above, the CPU 200 sets the analyzed correction levels Gd based on the result of the analysis of the image data GD, modifies the analyzed correction levels Gd with the image quality adjustment information described in the layout control information LI to calculate the modified correction levels Md, and executes image quality adjustment with the modified correction levels Md. The single image quality adjustment is thus sufficiently executed by taking into account the image characteristics of both the image data GD and the ornamental image data FD. This arrangement desirably shortens the processing time required for image quality adjustment without deteriorating the image quality of the processed image data GD.

In the second embodiment, each image data GD may be related to image processing control information GI to form one image file GF as shown in FIG. 10. The image processing control information GI may be described in a header of the image data GD or may be related to the image data GD by third correlation data.

When the image data GD is related to the image processing control information GI, the analyzed correction levels Gd may be set based on the image processing control information GI. When the image processing control information GI specifies a reduction rate of the difference between the characteristic value and the reference value of each image quality adjustment parameter, that is, a level of auto image quality adjustment, the analyzed correction level Gd is set according to the reduction rate specified in the image processing control information GI, instead of a preset reduction rate. When the image processing control information GI specifies a concrete setting of each image quality adjustment parameter, on the other hand, the setting is used as the analyzed correction level Gd, regardless of the result of the analysis of the image data GD. The image processing control information GI gives the analyzed correction level reflecting the photographer's demand.

Third Embodiment

Figure 11:
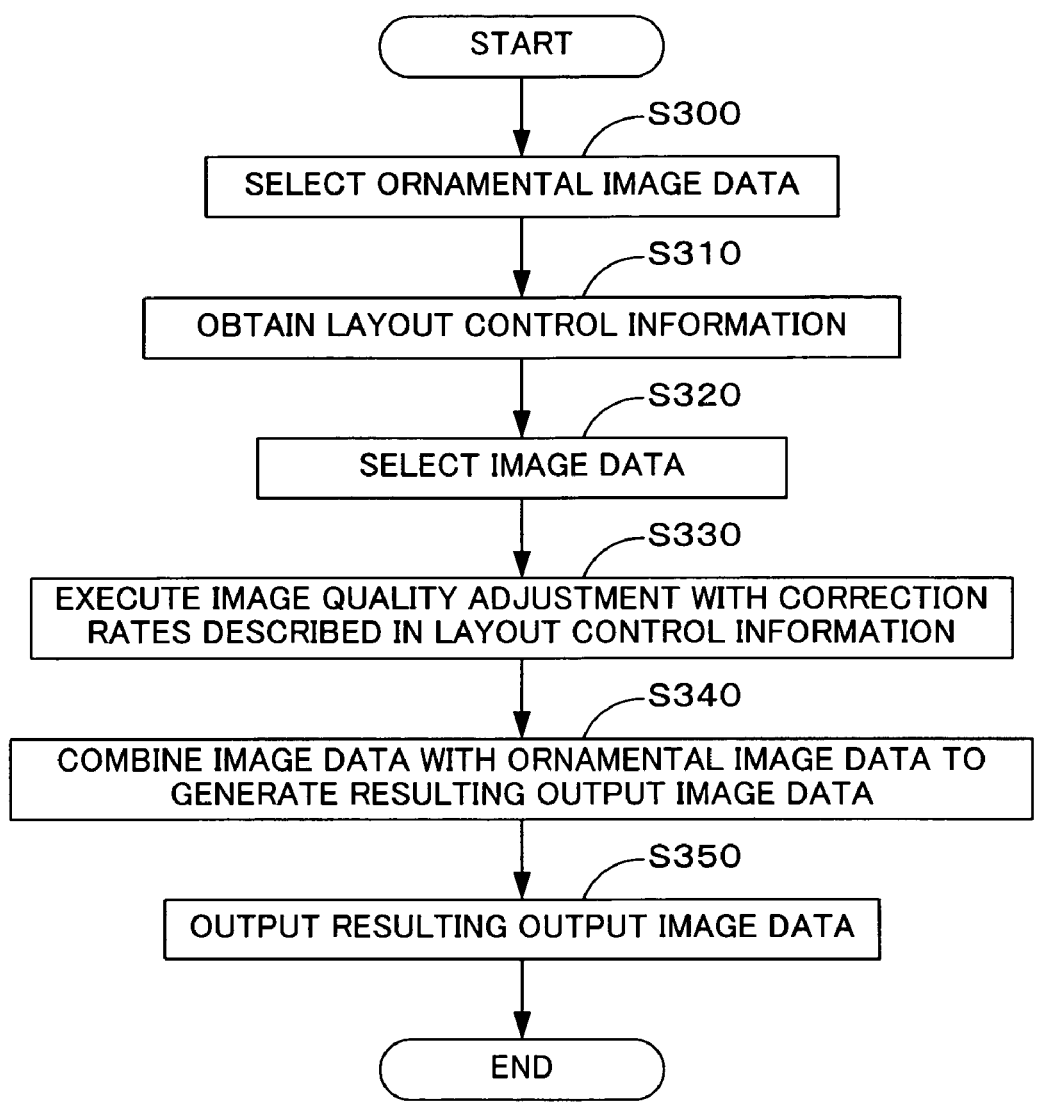
FIG. 11 is a flowchart showing an image processing routine executed by a personal computer as an image processing device in a third embodiment of the invention.
Figure 12:
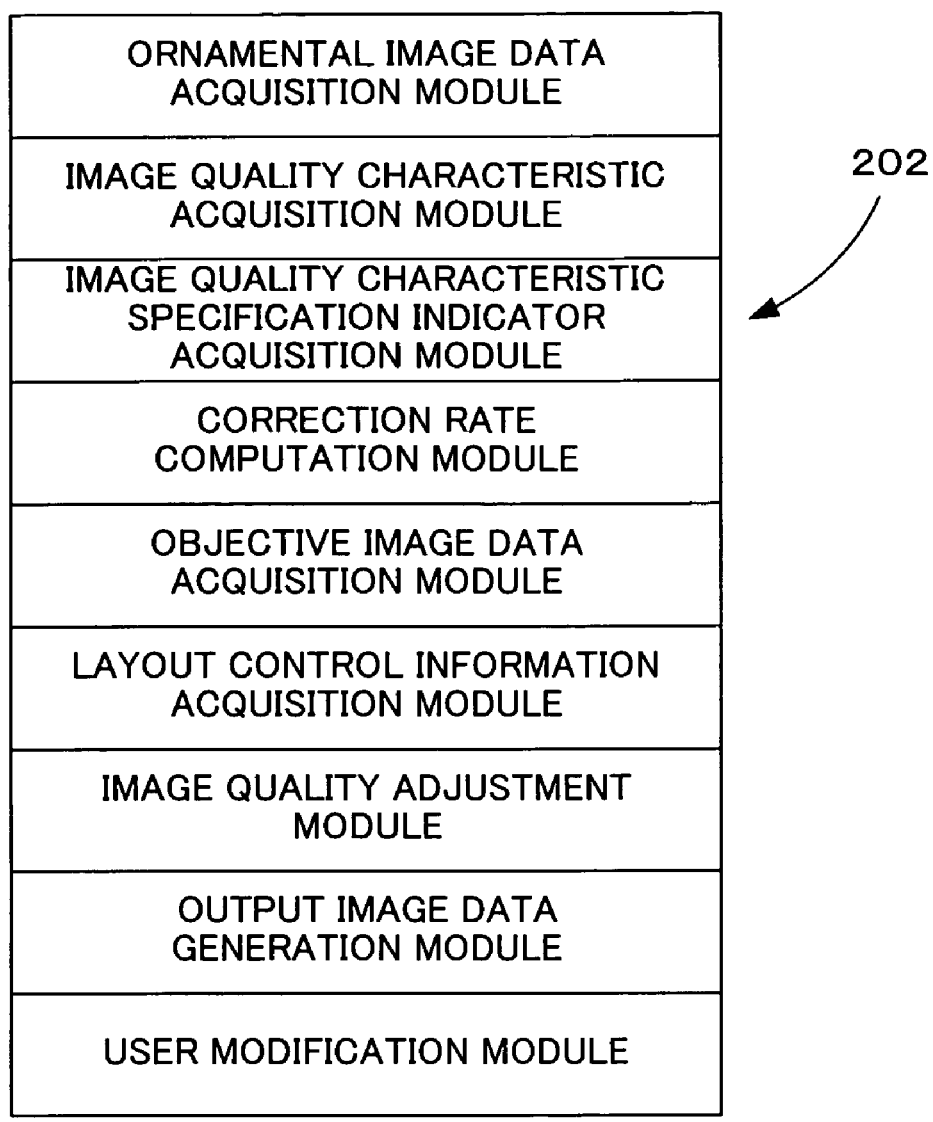
FIG. 12 shows respective functional modules stored in the HDD in the personal computer of the third embodiment.

An image processing device in a third embodiment of the invention is described with reference to FIGS. 11 and 12. FIG. 11 is a flowchart showing an image processing routine executed by the personal computer as an image processing device of the third embodiment. FIG. 12 shows respective functional modules stored in the HDD 202 in the personal computer 20 of the third embodiment. The structure of the personal computer as the image processing device of the third embodiment is identical with the structure of the personal computer 20 as the image processing device of the second embodiment. The like elements are expressed by the like numerals and are not specifically described here. As shown in FIG. 12, the HDD 202 of the personal computer 20 includes an ornamental image data acquisition module that obtains selected ornamental image data, an image quality characteristic acquisition module that analyzes the selected ornamental image data and acquires the image quality characteristics of the ornamental image data, an image quality characteristic specification indicator acquisition module that obtains image quality characteristic specification indicators for specifying the tendencies of the image quality characteristics of the ornamental image data, and a correction rate computation module that computes correction rates of objective image data based on the acquired image quality characteristic specification indicators and the obtained image quality characteristics. The HDD 202 also includes an objective image data acquisition module that obtains selected objective image data to be laid out on respective available layout locations of the selected ornamental image data, a layout control information acquisition module that obtains layout control information, which is related to the ornamental image data and describes available layout locations and layout dimensions of the objective image data, an image quality adjustment module that adjusts the image quality of the objective image data based on the computed correction rates, and an output image data generation module that generates resulting output image data including the image quality-adjusted objective image data and the ornamental image data according to the layout control information. The CPU 200 executes these modules to attain the series of image processing described below. The HDD 202 may additionally include a user modification module that modifies the layout locations and the layout dimensions described in the layout control information in response to the user's demand.

The procedure of the third embodiment does not analyze the image data GD to acquire the characteristic values of the respective image quality adjustment parameters nor compute the analyzed correction levels Gd but execute images quality adjustment with the correction rates K described in the layout control information LI. The steps identical with those of the second embodiment are not specifically described here, and the explanation mainly regards the differences from the second embodiment.

When the image processing starts, the CPU 200 selects desired ornamental image data FD (step S300) and obtains layout control information LI (step S310). The CPU 200 then selects desired image data GD (step S320) and executes image quality adjustment of the selected image data GD with the correction rates K described in the layout control information LI (step S330).

The image quality adjustment uses tone curves (S curves) that correlate input levels to output levels of the image data GD. A specific point for application of the correction rate K is set experimentally on each tone curve with regard to each image quality adjustment parameter. Application of the correction rate K varies the value of the tone curve at the preset specific point and accordingly changes the input-output characteristic of the tone curve. Application of the corrected tone curves to the image data GD makes the input-output conversion of the respective pixel data included in the image data GD and thereby gives the image quality-adjusted image data GD.

The CPU 200 combines the image quality-adjusted image data GD with the selected ornamental image data FD to generate resulting output image data (step S340) and outputs the resulting output image data to a printer driver or a video driver (step S350), before terminating this image processing routine.

The personal computer 20 in the third embodiment of the invention attains adjustment of the image quality tendencies of the image data GD to be different from or alternatively to be similar to those of the ornamental image data FD without analyzing the image data GD. The resulting output image may thus have an enhanced difference in image quality between an objective image and an ornamental image to make the objective image sufficiently highlighted against the ornamental image. The resulting output image may otherwise have a reduced difference in image quality between an objective image and an ornamental image to makes the objective image in good harmony with the ornamental image. In the third embodiment, the layout locations and the layout dimensions described in the layout control information LI may be changed in response to the user's entry via an input device of the personal computer 20.

Fourth Embodiment

Figure 13:
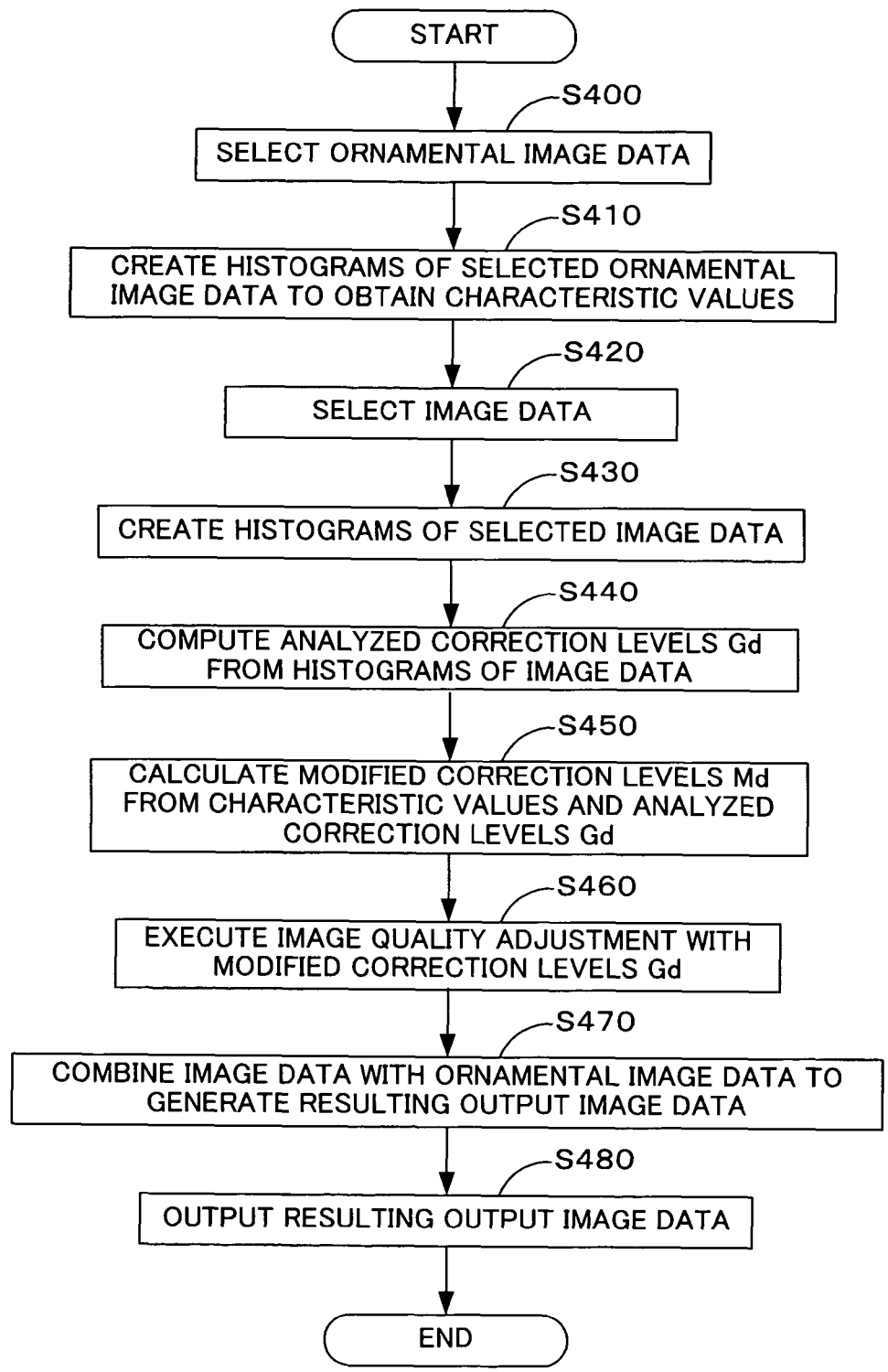
FIG. 13 is a flowchart showing an image processing routine executed by a personal computer as an image processing device in a fourth embodiment of the invention.
Figure 14:
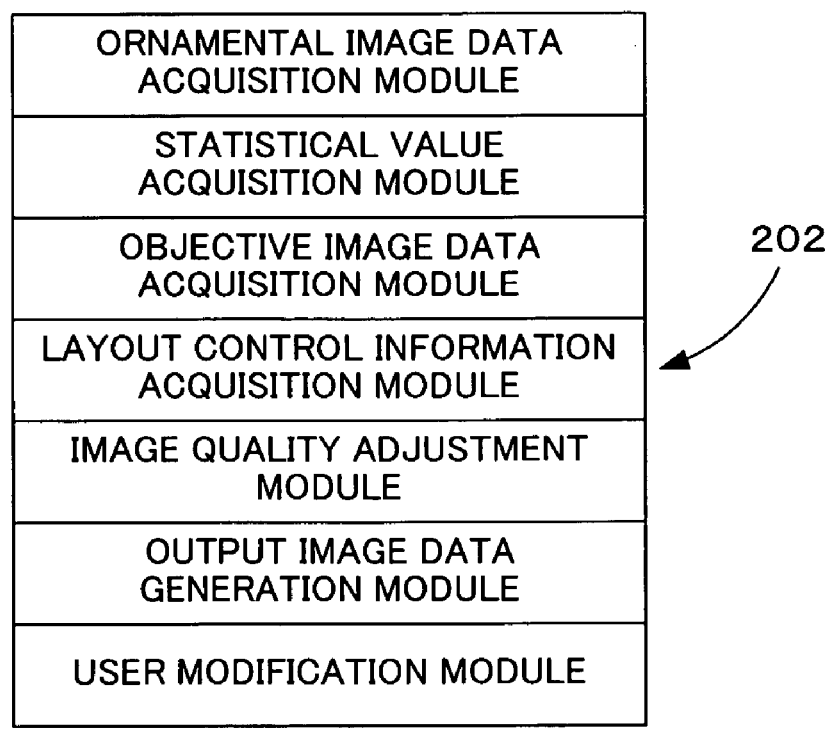
FIG. 14 shows respective functional modules stored in the HDD of the personal computer in the fourth embodiment.

An image processing device in a fourth embodiment of the invention is described with reference to FIGS. 13 and 14. FIG. 13 is a flowchart showing an image processing routine executed by the personal computer as an image processing device of the fourth embodiment. FIG. 14 shows respective functional modules stored in the HDD 202 of the personal computer 20 in the fourth embodiment. The structure of the personal computer as the image processing device of the fourth embodiment is identical with the structure of the personal computer 20 as the image processing device of the second embodiment. The like elements are expressed by the like numerals and are not specifically described here. As shown in FIG. 14, the HDD 202 of the personal computer 20 includes an ornamental image data acquisition module that obtains selected ornamental image data, a statistical value acquisition module that analyzes the selected ornamental image data and acquires statistical values of respective image quality adjustment parameters of the ornamental image data, and an objective image data acquisition module that obtains selected objective image data to be laid out on respective available layout locations of the selected ornamental image data. The HDD 202 also includes a layout control information acquisition module that obtains layout control information, which is related to the ornamental image data and describes available layout locations and layout dimensions of the objective image data, an image quality adjustment module that adjusts the image quality of the objective image data with the acquired statistical values, and an output image data generation module that generates resulting output image data including the image quality-adjusted objective image data and the ornamental image data according to the layout control information. The CPU 200 executes these modules to attain the series of image processing described below. The HDD 202 may additionally include a user modification module that modifies the layout locations and the layout dimensions described in the layout control information in response to the user's demand.

In the structure of the fourth embodiment, neither the characteristic values of the ornamental image data FD nor the correction rates of the image data GD are described in the layout control information LI. The personal computer 20 analyzes the image quality tendencies of the ornamental image data FD and computes the correction levels of the respective image quality adjustment parameters of the image data GD. The steps identical with those of the second embodiment are not specifically described here, and the explanation mainly regards the differences from the second embodiment.

When the image processing starts, the CPU 200 selects desired ornamental image data FD (step S400) and analyzes the selected ornamental image data FD to create histograms and obtain characteristic values (statistical values) of the ornamental image data FD (step S410). The technique described in the first embodiment may be applied to obtain the characteristic values of the ornamental image data FD.

The CPU 200 then selects desired image data GD (step S420), analyzes the selected image data GD to create histograms of the image data GD (step S430), and computes analyzed correction levels Gd from the created histograms (step S440). The CPU 200 calculates modified correction levels Md from the computed analyzed correction levels Gd and the characteristic values described in the layout control information LI (step S450).

The CPU 200 executes image quality adjustment of the selected image data GD with the modified correction levels Md (step S460). A concrete procedure applies the modified correction level Md to vary the value of each tone curve at a preset specific point with regard to each image quality adjustment parameter and accordingly changes the input-output characteristic of the tone curve. Application of the corrected tone curves to the image data GD varies the values of the respective pixel data and thereby changes the image quality characteristics of the image data GD.

The CPU 200 combines the image quality-adjusted image data GD with the selected ornamental image data FD to generate resulting output image data (step S470) and outputs the resulting output image data to a printer driver or a video driver (step S480), before terminating this image processing routine.

When neither the characteristic values of the ornamental image data FD nor the correction rates of the respective image quality adjustment parameters of the image data GD are described in the layout control information LI, the personal computer 20 in the fourth embodiment of the invention analyzes the ornamental image data to obtain the characteristic values and calculates the correction levels of the respective image quality adjustment parameters of the image data GD based on the obtained characteristic values. Even when the layout control information LI includes neither the characteristic values nor the correction rates, this arrangement adequately controls the image quality balance between the image data GD and the ornamental image data FD. The resulting output image may have an enhanced difference in image quality between an objective image and an ornamental image to make the objective image sufficiently highlighted against the ornamental image. The resulting output image may otherwise have a reduced difference in image quality between an objective image and an ornamental image to makes the objective image in good harmony with the ornamental image. In the fourth embodiment, the layout locations and the layout dimensions described in the layout control information LI may be changed in response to the user's entry via an input device of the personal computer 20.

Modifications

The procedure of the first embodiment sets the correction rate K of each image quality adjustment parameter with regard to the image data GD to have a different image quality tendency from the image quality tendency of the ornamental image data FD. The correction rate K may alternatively be set to have a similar image quality tendency to the image quality tendency of the ornamental image data GD. This modified procedure makes the image quality tendency of the image data GD similar to the image quality tendency of the ornamental image data FD, thus harmonizing an objective image with an ornamental image in a resulting output image.

The above description of the second through the fourth embodiments is on the assumption that only one image data GD is laid out on one ornamental image data FD. One or multiple image data GD may be laid out on one or multiple ornamental image data FD. In such cases, the image quality adjustment process described above is executed for the one or multiple image data GD pasted on each ornamental image data FD.

In the second through the fourth embodiments discussed above, the personal computer 20 is adopted as the image processing device to execute the series of image processing.

The image processing device is, however, not restricted to the personal computer but may be, for example, a standalone printer or a standalone display device having the image processing functions to execute the series of image processing. The technique of the invention is also attained by a printer driver, a video driver, and an image processing application program without the hardware configuration of the image processing device.

All or part of the image processing may be executed by the digital still camera 10, in place of the personal computer PC. In this case, the image processing functions discussed in any of the second through the fourth embodiments are added to an image data processing application program, for example, a retouch application program or a printer driver stored in a ROM of the digital still camera 10. Print data, which include print image data and print control commands and are generated by the digital still camera 10, are given to the printer 30 via the cable or via the memory card MC. The printer 30 receives the print data and creates a dot pattern on a printing medium according to the received print image data to output a printed image. The digital still camera 10 may alternatively give output image data (processed image data) to the personal computer 20 or the printer 30. The personal computer 20 or the printer 30 then generates print data including print control commands.

In the second and the third embodiments, the correction rates of the respective image quality adjustment parameters with regard to the image data GD are described in the layout control information LI. The techniques of the second and the third embodiments are executable when only the characteristic values of the ornamental image data FD are described in the layout control information LI. In this case, the personal computer 20 refers to the characteristic values described in the layout control information LI and computes the correction rates of the respective image quality adjustment parameters with regard to the image data GD. The technique of the first embodiment may be applied to the computation of the correction rates of the respective image quality adjustment parameters.

In the above embodiments, the series of image quality adjustment information generation process and image processing are executed by the corresponding software or computer programs. The image quality adjustment information generation process and the image processing may respectively be attained by an image quality adjustment information generation hardware circuit and an image processing hardware circuit including logic circuits of respective processing steps. This modified structure desirably relieves the process load of the CPU 200 and ensures the higher-speed image quality adjustment information generation process and the higher-speed image processing. The image quality adjustment information generation hardware circuit and the image processing hardware circuit are mounted, for example, as packaged circuits mounted on the digital still camera 10 or the printer 30 or as add-on cards mounted on the personal computer 20.

The image quality adjustment information generation device, the image processing device, the image quality adjustment information generation method, the image processing method, the image quality adjustment information generation program, and the image processing program of the invention are described in detail with reference to some embodiments. These embodiments discussed above are, however, to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

The following Japanese patent applications as the basis of the priority claim of this application are incorporated in the disclosure hereof by reference:

Japanese Patent Application No. 2003-316128 (filing date: Sep. 9, 2003); and

Japanese Patent Application No. 2004-253801 (filing date: Sep. 1, 2004).

What is claimed is:

1. An image quality adjustment information generation method that generates image quality adjustment information with regard to objective image data, which is laid out on a location of ornamental image data, said image quality adjustment information generation method comprising:

obtaining the ornamental image data;

analyzing the obtained ornamental image data to acquire an image quality characteristic of the ornamental image data, wherein the image quality characteristic of the ornamental image data includes statistical values of color components R, G, and B, and luminance;

acquiring an image quality characteristic specification indicator for specifying a tendency of the image quality characteristic of the ornamental image data;

computing a correction rate of the objective image data from the acquired image quality characteristic specification indicator and the acquired image quality characteristic of the ornamental image data, wherein the computed correction rate is used in the image quality adjustment for the objective image data, wherein the acquired image quality characteristic specification indicator is used in the computing the correction rate to realize the image quality adjustment for the objective image data in which the image quality of the objective image data is adjusted so that a tendency of the image quality characteristic of the objective image data is different from the tendency of the image quality characteristic of the ornamental image data; and writing the computed correction rate into layout control information, which is related to the ornamental image data and specifies a layout location and layout dimensions of the objective image data to be laid out on the location of the ornamental image data, wherein each operation of the image quality adjustment information generation method is executed by a processor.

2. An image quality adjustment information generation method in accordance with claim 1, wherein said analyzing the obtained ornamental image data and said writing the computed correction rate are executed only when the layout control information includes neither description of an image quality characteristic nor description of a correction rate.

3. An image quality adjustment information generation method in accordance with claim 1, wherein said computing the correction rate and said writing the computed correction rate are executed only when the layout control information does not include description of the correction rate.

4. An image quality adjustment information generation device that generates image quality adjustment information with regard to objective image data, which is laid out on a location of ornamental image data, said image quality adjustment information generation device comprising:

an ornamental image data acquisition module that obtains the ornamental image data;

an image quality characteristic acquisition module that analyzes the obtained ornamental image data to acquire an image quality characteristic of the ornamental image data, wherein the image quality characteristic of the ornamental image data includes statistical values of color components R, G, and B, and luminance;

an image quality characteristic specification indicator acquiring module that acquires the image quality characteristic specification indicator that specifies a tendency of the image quality characteristic of the ornamental image data;

a correction rate of the objective image data computing module that computes the correction rate of the objective image data from the acquired image quality characteristic specification indicator and the acquired image quality characteristic of the ornamental image data, wherein the computed correction rate is used in the image quality adjustment for the objective image data, wherein the acquired image quality characteristic specification indicator is used in the computing the correction rate to realize the image quality adjustment for the objective image data in which the image quality of the objective image data is adjusted so that a tendency of the image quality characteristic of the objective image data is different from the tendency of the image quality characteristics of the ornamental image data; and a writing module that writes the computed correction rate into layout control information, which is related to the ornamental image data and specifies a layout location and layout dimensions of the objective image data to be laid out on the location of the ornamental image data.

* * * * *